(12) United States Patent
Badyal et al.

(10) Patent No.: US 10,449,473 B2
(45) Date of Patent: Oct. 22, 2019

(54) ULTRA FAST OLEOPHOBIC-HYDROPHILIC SWITCHING SURFACES

(71) Applicant: University of Durham, Old Elvet, Durham (GB)

(72) Inventors: Jas Pal Singh Badyal, Wolsingham (GB); Olivia Diane Louise Amy Atkinson, Hale (GB); Philip Simon Brown, Harrogate (GB)

(73) Assignee: The University of Durham, Durham (GB)

( * ) Notice: Subject to any disclaimer, the term of this patent is extended or adjusted under 35 U.S.C. 154(b) by 551 days.

(21) Appl. No.: 15/037,645

(22) PCT Filed: Nov. 19, 2014

(86) PCT No.: PCT/GB2014/053421
§ 371 (c)(1),
(2) Date: May 18, 2016

(87) PCT Pub. No.: WO2015/075446
PCT Pub. Date: May 28, 2015

(65) Prior Publication Data
US 2016/0296866 A1    Oct. 13, 2016

(30) Foreign Application Priority Data
Nov. 22, 2013   (GB) .................................. 1320676.8

(51) Int. Cl.
*C02F 1/00*      (2006.01)
*B01D 17/02*    (2006.01)
(Continued)

(52) U.S. Cl.
CPC ............. *B01D 37/02* (2013.01); *B01D 17/02* (2013.01); *C09D 5/16* (2013.01);
(Continued)

(58) Field of Classification Search
USPC .......................................... 210/506; 427/209
See application file for complete search history.

(56) References Cited

U.S. PATENT DOCUMENTS 5,439,610 A    8/1995  Ryan et al.
2009/0041984 A1    2/2009  Mayers et al.

FOREIGN PATENT DOCUMENTS

CN    101899240    12/2010

OTHER PUBLICATIONS

Zhong Xin Liu et al: "Effect of Surfactant on the Properties of Gel Ink", Advanced Materials Research, vol. 66, Apr. 1, 2009.
(Continued)

*Primary Examiner* — Allison G Fitzsimmons
(74) *Attorney, Agent, or Firm* — Gable Gotwals (57) ABSTRACT

The invention provides a coating which exhibits fast oleophobic-hydrophilic switching behaviour with, for example, equilibration of high oil contact angle (hexadecane=80°) and low water contact angle (<10°) values which occur within 10 s of droplet impact. These optically transparent surfaces display excellent anti-fogging and self-cleaning properties. The magnitude of oleophobic-hydrophilic switching can be further enhanced by the incorporation of surface roughness and in one embodiment the coating is applied to a surface in the form of a mesh in order to form an effective filter.

19 Claims, 8 Drawing Sheets

(51) Int. Cl.
  *B01D 37/02* (2006.01)
  *C09D 5/16* (2006.01)
  *C09D 135/06* (2006.01)
  *C09D 123/08* (2006.01)
  *C09D 125/08* (2006.01)
  *C09D 135/00* (2006.01)
(52) U.S. Cl.
  CPC ..... *C09D 123/0869* (2013.01); *C09D 125/08* (2013.01); *C09D 135/00* (2013.01); *C09D 135/06* (2013.01)

(56) References Cited

OTHER PUBLICATIONS

Sawada et al., "Synthesis and Surface Properties of Novel Fluoroalkylated Flip-Flop-Type Silane Coupling Agents", Langmuir, The ACS Journal of Surfaces and Colloids, vol. 12.
Sawada et al.," Synthesis and Applications of a Variety of Fluoroalkyl End-Capped Oligomers/Silica Gel Polymer Hybrids", Journal of Applied Polyme Science, vol. 98, 169-177.
Hutton et al., "Complexation of Fluorosurfactants to Functionalized Solid Surfaces: Smart Behavior", Chem. Mater, 2000, 12, 2282-2286.
Lampitt et al., "Switching Liquid Repellent Surfaces", J. Phys. Chem., B 2000, 104, 10329-10331.
Yang et al., "Superhydrophilic-superoleophobic coatings", Journal of Materials Chemistry, 2012, 22, 2834-2837.
Turri et al., "Hydrophilic-oleophobic behaviour in thin films from fluoromodified nanoclays and polystyrene", Polym. Bull. 2009, 63:235-243.
Antonietti et al., "Highly Ordered Materials with Ultra-Low Surface Energies: Polyelectrolyte-Surfactant Complexes with Flourinated Surfactants", Advanced Materials, 8, No. 1.
Howarter et al., "Wetting Behavior of Oleophobic Polymer Coatings Synthesized from Fluorosurfactant-Macromers", Applied Materials, 2011, 3, 2022-2030.

Uncoated　　　　Coated

ULTRA FAST OLEOPHOBIC-HYDROPHILIC SWITCHING SURFACES

CROSS-REFERENCE TO RELATED APPLICATIONS

This United States application is the National Phase of PCT Application No. PCT/GB2014/053421 filed 19 Nov. 2014, which claims priority to British Patent Application No. 1320676.8 filed 22 Nov. 2013, each of which is incorporated herein by reference.

The invention to which this application relates is apparatus and a method for applying coatings to improve the ability to provide Oleophobic and/or Hydrophilic surfaces on an item.

A problem which is addressed by the current invention is the ability to separate different components from a fluid and to do in a manner which allows one of the components to be collected and processed separately from at least one other components of the fluid.

An example of a fluid which has a number of components and which are required to be separated in order to allow the efficient treatment of the same, is a fluid which is created by off-shore oil spillages, fracking (where water-based fluids are used to fracture rocks for the release of oil and gas), and the like.

It is known that the separation of oil and water is an important environmental challenge. Existing methods for the removal or collection of oils from an oil-water mixture most typically utilise absorbent materials such as zeolites, organoclays, non-woven polypropylene, or natural fibres (such as straw, cellulose, or wool). However, these materials tend to also absorb water, thereby reducing their efficiency. In addition, further processing steps then need to be performed in order to remove the absorbed oil from the absorbent material. This makes it difficult to incorporate this type of treatment into continuous flow systems which would be preferable on site such as being performed by clean-up vessels.

It is further known to be able to use separation membranes that repel one liquid component whilst allowing another component to pass through the same. Typically, these membranes are made out of hydrophobic and oleophilic materials so that water can run off the surface whilst oil is allowed to permeate through the membrane. However a problem with the use of this form of membrane is that surface contamination of the membrane by the oil culminates in a drop in the efficiency of the separation which is achieved.

It is yet further known to utilise articles with oleophobic-hydrophilic surfaces which allow, for example, oil and oil-based contaminants to be repelled by the surface coating and allows the water component to pass through the same.

These oleophobic-hydrophilic surfaces are also of use for other applications such as for self-cleaning surfaces, anti-fogging of the surface, and anti-fouling applications. The invention as herein described provides coatings in a form which can be utilised in the provision of advantageous improvements to any one or combination of these applications.

One class of oleophobic-hydrophilic surfaces are polyelectrolyte-surfactant complexes, where the surfactant is attached to the polyelectrolyte via an oppositely charged electrostatic interaction. In the case of polyelectrolyte-fluorosurfactant complexes, the fluorinated alkyl chains can orientate towards the air-solid interface to provide a low surface energy film. Such alignment localises hydrophilic portions of the polyelectrolyte in the near-surface region due to electrostatic attraction. This means that when water is placed onto the surface, it penetrates through defects in the fluorinated outermost layer towards the hydrophilic subsurface to provide hydrophilicity, whilst larger oil molecules are unable to penetrate through this top layer to leave the surface oleophobic. However, known polyelectrolyte-surfactant complex oleophobic-hydrophilic surfaces have not been widely used due to the fact that it can take several minutes for the water to penetrate through the fluorinated top layer of the coating and this results in a surface that is initially hydrophobic and at which stage the level of oil repellence is poor with hexadecane contact angles of only 70° or less.

Pulsed plasma deposited poly(maleic anhydride) and poly (acrylic acid) surfaces that were subsequently complexed to fluorosurfactant displayed improved oleophobicity; however, the two step process is unsuitable for many industrial applications.

It is therefore an object of the present invention to provide a coating that overcomes the aforementioned problems in the prior art. It is a further object of the present invention to provide a method of forming such a coating and to form articles including said coating which then have advantageous use.

In a first aspect of the invention, there is provided a coating which has an oleophobic-hydrophilic switching parameter (the difference in measured static contact angle between oil and water droplets) magnitude of at least 60° and/or a switching speed of less than 10 seconds.

In one embodiment, the coating has a switching parameter of at least 90°.

In one embodiment, the coating has a switching speed of less than 1 second.

In one embodiment, said coating comprises a copolymer-fluorosurfactant complex.

Typically, said coating forms a fast-switching oleophobic-hydrophilic polyelectrolyte-fluorosurfactant surface of an article.

In one embodiment, said copolymer-fluorosurfactant complex is dip or spin coated onto a surface of the article. Typically, said copolymer-fluorosurfactant complex is dip or spin coated from a dimethylformamide (DMF) solvent.

In one embodiment the said application of the coating using dip coating provides a coating with a smoother surface such that in one embodiment the coating formed from DMF solvent produces a relatively smooth coating surface with an AFM RMS roughness in the range of 1-5 nm.

In one embodiment, the coating surface with an AFM RMS roughness in the range of 1-5 nm is prepared for use in relation to the provision of an improved coating for anti-fogging and/or self-cleaning applications.

In one embodiment, the coating which is applied comprises a mixed solvent and is used to create a coating with a relatively roughened surface effect. In one embodiment the coating is applied using spin coating. Typically, said coating comprising said mixed solvent is most effective for use when applied to an article for use in the separation of components from a fluid.

In one embodiment, said copolymer-fluorosurfactant complex is spin coated from a dimethylformamide-methanol solvent mixture. Typically, said dimethylformamide-methanol solvent mixture produces an increased surface roughness.

Typically, the roughness of the surface of the coating is enhanced by allowing the evaporation of at least one of the components of the mixed solvent mixture that is used to form the coating as the coating dries.

The present invention has many uses, including the separation of at least one component of a fluid and more typically, a liquid, such as for example the separation of the oil and water components from an oil and water mixture.

In one embodiment, the coating is applied onto an article which acts as a base.

In one embodiment the base is a mesh such that the coating causes one of the components of the fluid, when applied thereto, to remain on the coating surface and be subsequently slidably removed therefrom and the other component to pass through the coating and hence through the mesh.

In one embodiment, the material which passes through the mesh is collected as a fluid or alternatively, may be absorbed into a further layer of the material. In an alternative to mesh, a cloth or other filter material could be used.

The base with the coating applied thereto in accordance with the invention can be used independently, or as part of a filtration system in which there maybe, for example, an initial, coarse filtration, a filtration using the invention and further finer filtrations of the separated materials.

In one embodiment, fast-switching oleophobic-hydrophilic polyelectrolyte-fluorosurfactant surfaces are created by utilising a maleic anhydride copolymer. Typically, said fast-switching oleophobic-hydrophilic polyelectrolyte-fluorosurfactant surfaces are created by utilising one or more from the group comprising: poly(ethylene-alt-maleic anhydride); poly(styrene-alt-maleic anhydride); and poly(styrene-co-maleic anhydride).

In a further aspect of the invention there is provided a method for forming a coating, said method comprising the selection of a base; the application of a coating material onto at least one surface of the base by dip coating or spray coating, said coating material comprising at least two components; and the drying of the coating material to allow at least one component of the coating material to evaporate.

In one embodiment, the drying of the coating causes the evaporation of at least one of the components of the coating material to cause surface roughness to be created. Typically, surface roughness is increased by applying the coating material by spray coating.

In one embodiment, at least one of the components of the coating material comprises a copolymer-fluorosurfactant complex. Typically, said coating forms a fast-switching oleophobic-hydrophilic polyelectrolyte-fluoro surfactant surface.

In one embodiment, said fast-switching oleophobic-hydrophilic polyelectrolyte-fluorosurfactant surfaces are created by utilising a maleic anhydride copolymer. Typically, said fast-switching oleophobic-hydrophilic polyelectrolyte-fluorosurfactant surfaces are created by utilising one or more from the group comprising: poly(ethylene-alt-maleic anhydride); poly(styrene-alt-maleic anhydride); and poly(styrene-co-maleic anhydride).

In one embodiment, at least one of the components of the coating material comprises a solvent. Typically, said solvent comprises dimethylformamide (DMF). Further typically, said solvent comprises a mixed solvent. Yet further typically, said solvent mixture comprises a dimethylformamide-methanol (DMF-MeOH) solvent mixture.

In a further aspect of the invention there is provided an article, said article including a coating formed in accordance with the method as herein described.

Specific embodiments of the invention are now described with reference to the accompanying figures wherein.

In accordance with the invention, polished silicon (100) wafers (Silicon Valley Microelectronics, Inc.) and glass slides (Academy Science Ltd.) were used as flat substrates. Poly(ethylene-alt-maleic anhydride) (Vertellus Specialties Inc.), poly(styrene-alt-maleic anhydride) (Apollo Scientific Ltd.), or poly(styrene-co-maleic anhydride) (Polyscope Polymers BV) were dissolved in acetone (+99.8%, Sigma Aldrich Ltd.) at a concentration of 2% (w/v). The cationic fluorosurfactant (Zonyl® FSD, DuPont Ltd.) employed for complexation was dissolved in high purity water at a concentration of 5% (v/v) and then added to the copolymer solution. The precipitated solid was collected from the liquid phase and dissolved at a concentration of 2% (w/v) in dimethylformamide (99%, Fisher Scientific UK Ltd.) for preparation of smooth surfaces and, in the case of the poly(styrene-co-maleic anhydride)-fluorosurfactant complex, varying composition dimethylformamide-methanol (99%, Sigma Aldrich Ltd.) solvent mixtures were utilised to produce rough surfaces. Spin coating was carried out using a photoresist spinner (Cammax Precima) operating at 2000 rpm. For the oil-water separation experiments, stainless steel mesh (0.16 mm wire diameter, 0.20 mm square holes, The Mesh Company Ltd.) was dip coated in the copolymer-fluorosurfactant complex solution and the solvent was allowed to evaporate.

Glass transition temperatures of the copolymer and copolymer-fluorosurfactant complexes were measured by differential scanning calorimetry (DSC, Pyris 1, Perkin Elmer Inc.).

Microlitre sessile drop contact angle analysis was carried out with a video capture system (VCA2500XE, AST Products Inc.) using 1.0 µL dispensation of de-ionised water (BS 3978 grade 1), hexadecane (99%, Sigma Aldrich Ltd.), tetradecane (+99%, Sigma Aldrich Ltd.), dodecane (99%, Sigma Aldrich Ltd.), decane (+99%, Sigma Aldrich Ltd.), octane (+99%, Sigma Aldrich Ltd.), heptane (99%, Sigma Aldrich Ltd.), hexane (+99%, Sigma Aldrich Ltd.), and pentane (+99%, Sigma Aldrich Ltd.). Advancing and receding contact angles were measured by respectively increasing and decreasing the droplet size until the contact line was observed to move. Oil repellency was further tested using motor engine oil (GTX 15W-40, Castrol Ltd.) and olive cooking oil (Tesco PLC). Switching parameters were determined by calculating the difference between equilibrium hexadecane and water contact angles.

Atomic force microscopy (AFM) images were collected in tapping mode at 20° C. in ambient air (Nanoscope III, Digital Instruments, Santa Barbara, Calif.) using a tapping mode tip with a spring constant of 42-83 N m$^{-1}$ (Nanoprobe). Root-mean-square (RMS) roughness values were calculated over 100×100 µm scan areas.

Anti-fogging was tested by exposing the coated surfaces to a high purity water spray from a pressurised nozzle (RG-3L, Anest Iwata Inc.). Self-cleaning was tested by dispensing oil droplets onto a surface followed by rinsing with high purity water. Oil-water separation was tested by pouring an agitated mixture of oil and water over stainless steel mesh which has been dip coated with copolymer-fluorosurfactant complex. Oil Red O (≥75% dye content, Sigma Aldrich Ltd) and Procion® Blue MX-R (35% dye content, Sigma Aldrich Ltd.) were employed as oil and water dispersible dyes respectively in order to enhance visual contrast (similar results were obtained in absence of dye).

In the present invention, fast-switching oleophobic-hydrophilic polyelectrolyte-fluorosurfactant surfaces were created by utilising three different maleic anhydride copolymers, shown in Scheme 1, below. In order to systematically investigate the role of polymer backbone structure, these comprised poly(ethylene-alt-maleic anhydride) alternating copolymer as a reference standard (based on previously reported polyelectrolyte-fluorosurfactant switching studies); poly(styrene-alt-maleic anhydride) where the aforementioned alternating copolymer ethylene segments are replaced with styrene segments; and finally poly(styrene-co-maleic anhydride), which is a copolymer comprising singe maleic anhydride units alternating with styrene block segments (because maleic anhydride does not homopolymerise).

Scheme 1: Copolymers and cationic fluorosurfactant used to prepare copolymer-fluorosurfactant complexes

Poly(ethylene-alt-maleic anhydride)

Poly(styrene-alt-maleic anhydride)

Poly(styrene-co-maleic anhydride)
(where x = 0 for alternating copolymer)

Zonyl® FSD cationic fluorosurfactant
(where z = 6-20)

With regard to surface switching of the costing the results show, via Differential scanning calorimetry (DSC), that the poly(ethylene-alt-maleic anhydride) copolymer has a higher glass transition temperature compared to the poly(styrene-alt-maleic anhydride), which can be attributed to the larger molecular weight of the former and less ordering due to the stiff and bulky styrene groups for the latter, see Table 1 below. In the case of the poly(styrene-co-maleic anhydride) copolymer, the presence of a single glass transition temperature is consistent with block styrene segments alternating with single maleic anhydride units (since a plausible alternative diblock copolymer structure should display two respective glass transition temperatures), Scheme 1. Also, its higher glass transition temperature compared to the poly (styrene-alt-maleic anhydride) alternating copolymer stems from a combination of higher molecular weight and favourable intermolecular interactions between adjacent styrene units contained within the block styrene segments.

TABLE 1

Glass transition temperatures of copolymers
and copolymer-fluorosurfactant complexes

| Copolymer | Maleic Anhydride Content/ wt. % | Molecular Weight/g mol$^{-1}$ | Glass Transition Temperature/° C. | |
|---|---|---|---|---|
| | | | Co-polymer | Copolymer-Fluorosurfactant Complex |
| Poly(ethylene-alt-maleic anhydride) | 50 | 60,000 | 155 | 157 |
| Poly(styrene-alt-maleic anhydride) | 50 | 50,000 | 120 | 131 |
| Poly(styrene-co-maleic anhydride) | 26 | 80,000 | 160 | 138 |

Following fluoro surfactant complexation, both the poly(ethylene-alt-maleic anhydride) and poly(styrene-alt-maleic anhydride) copolymer-fluoro surfactant complexes display raised glass transition temperatures, which suggests a greater degree of ordering upon surfactant complexation, and is consistent with previous studies relating to copolymer-surfactant complex systems, Table 1.

In contrast, for the poly(styrene-co-maleic anhydride)-fluorosurfactant complex, the glass transition temperature is lower compared to that of the parent copolymer; this may be due to disruption of the favourable intermolecular interactions between adjacent styrene units contained within the block segments (something which is absent for the parent alternating copolymers).

Figure 1:
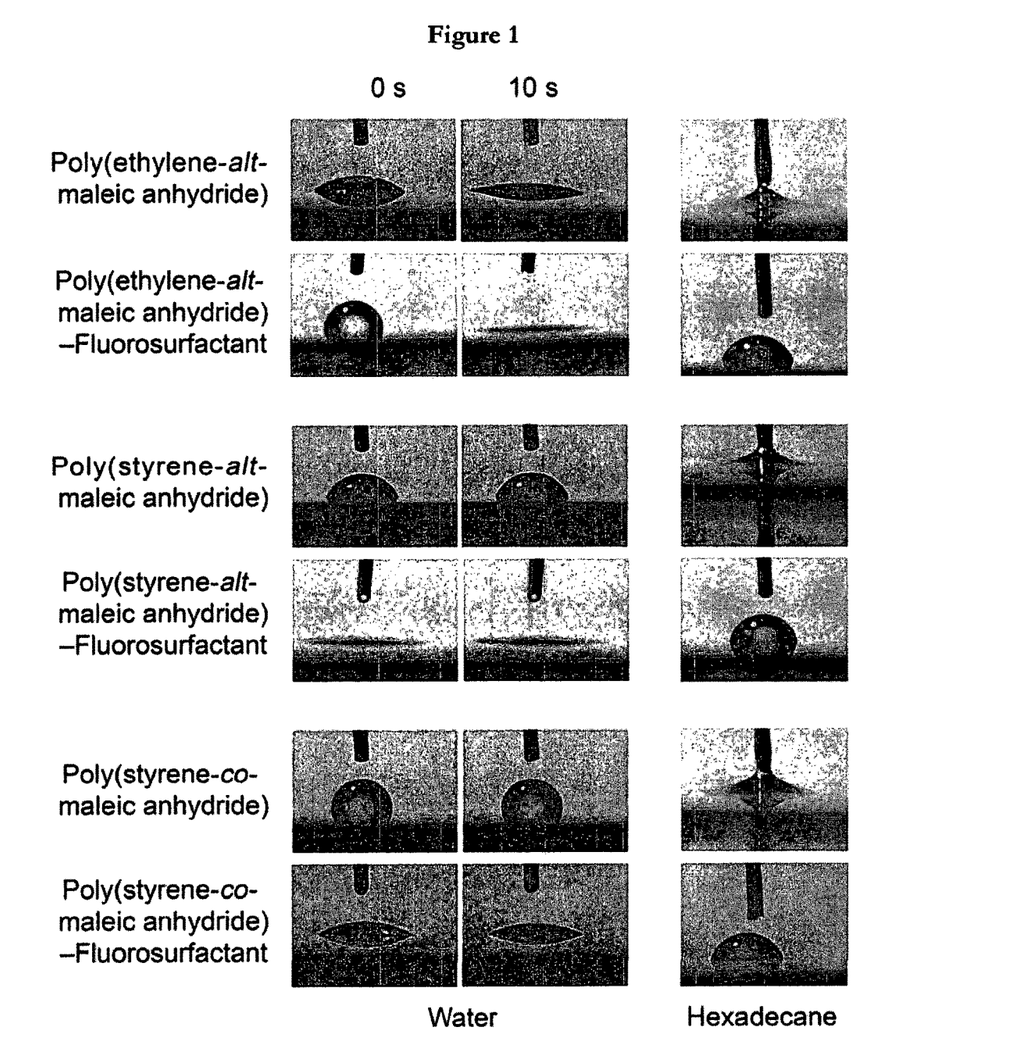
FIG. 1 illustrates microlitre water and hexadecane droplets dispensed onto copolymer spin coated from acetone solvent and copolymer-fluorosurfactant complex surfaces spin coated from dimethylformamide solvent.

Spin coating of all three copolymer-fluorosurfactant complexes dissolved in dimethylformamide (DMF) onto silicon wafers and glass slides produced smooth films (AFM RMS roughness=1-5 nm), see Table 2 below. In all cases, a time period of 10 s was sufficient for the water contact angles to reach their final static values (in fact, the poly(styrene-alt-maleic anhydride)-fluorosurfactant system underwent instantaneous water wetting); whereas hexadecane droplets remained stationary, FIG. 1 and Table 2. Copolymer-fluorosurfactant complex surfaces that were prepared using an alternative quaternary ammonium cationic fluorosurfactant (S-106A, Chemguard) displayed similar oleophobic-hydrophilic switching behaviour. This was also found to be the case for copolymer-fluorosurfactant complex surfaces created using a cationic copolymer (poly(styrene-alt-maleimide), SMA® 10001, Cray Valley HSC) and an anionic fluorosurfactant (Capstone® FS-63, Dupont Ltd.). Control experiments utilising any of the parent copolymers (in the absence of fluorosurfactant complexation) showed the converse trend, with an absence of superhydrophilicity and instantaneous spreading of hexadecane droplets, shown in Table 2, below.

TABLE 2

Microlitre water and hexadecane static contact angles for copolymer spin coated from acetone solvent; copolymer-fluorosurfactant complex surfaces (smooth) spin coated from dimethylformamide (DMF) solvent; and poly(styrene-co-maleic anhydride)-fluorosurfactant complex surfaces (rough) spin coated from 33 vol % DMF-66 vol % methanol. Water droplets were allowed to relax for 10 seconds to reach equilibrium prior to final static contact angle measurement. No relaxation in contact angle was observed for hexadecane droplets. AFM surface roughness values are included for comparison.

| | AFM RMS Roughness/ nm | Static Water Contact Angle/° | | Hexadecane Contact Angle/° | | | |
|---|---|---|---|---|---|---|---|
| | | 0 s | 10 s | Static | Advancing | Receding | Hysteresis |
| Poly(ethylene-alt-maleic anhydride) | 4.4 ± 1 | 38 ± 2 | 22 ± 2 | Wets | — | — | — |
| Poly(ethylene-alt-maleic anhydride)-fluorosurfactant | 1.1 ± 0.3 | 88 ± 2 | <10 | 74 ± 1 | 76 ± 2 | 72 ± 2 | 4 ± 2 |
| Poly(styrene-alt-maleic anhydride) | 6.7 ± 1 | 68 ± 2 | 66 ± 2 | Wets | — | — | — |
| Poly(styrene-alt-maleic anhydride)-fluorosurfactant | 2.7 ± 0.3 | <10 | <10 | 80 ± 2 | 85 ± 2 | 66 ± 2 | 19 ± 2 |
| Poly(styrene-co-maleic anhydride) | 10.3 ± 1 | 90 ± 2 | 90 ± 2 | Wets | — | — | — |
| Poly(styrene-co-maleic anhydride)-fluorosurfactant | 5.3 ± 1 | 36 ± 2 | 23 ± 2 | 80 ± 2 | 88 ± 2 | 66 ± 2 | 22 ± 2 |
| Poly(styrene-co-maleic anhydride)-fluorosurfactant 33 vol % DMF-66 vol % methanol | 246 ± 3 | <10 | <10 | 112 ± 5 | 125 ± 5 | <10 | >115 |

Figure 2:
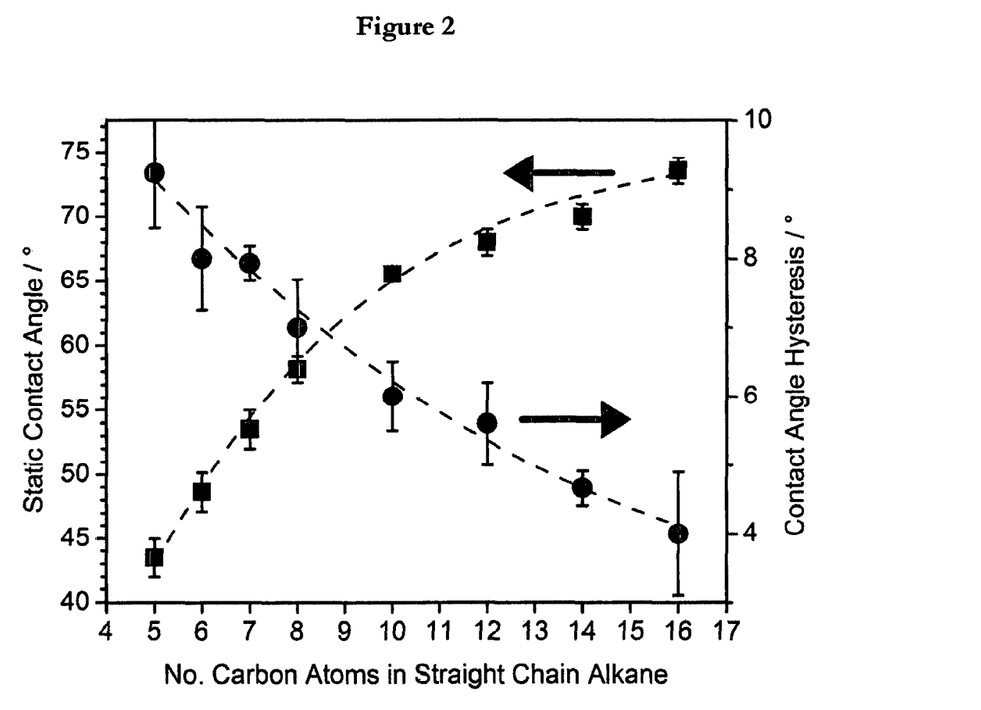
FIG. 2 illustrates microlitre droplet oil static contact angles and contact angle hysteresis on poly(ethylene-alt-maleic anhydride)-fluoro surfactant complex surfaces spin coated from dimethylformamide solvent as a function of liquid alkane chain length.

Oil repellence of the poly(ethylene-alt-maleic anhydride)-fluorosurfactant complex surfaces was found to improve (higher contact angle and lower hysteresis) with increasing hydrocarbon length of straight chain alkane droplets, FIG. 2. A similar trend was observed for both of the poly(styrene-maleic anhydride)-fluorosurfactant complex surfaces. Furthermore, olive oil and motor engine oil spreading were shown to be inhibited on all three types of copolymer-fluorosurfactant complex surfaces, FIG. 3. Note, hexadecane and octant droplets are dyed with Oil Red O (Sigma Aldrich Ltd) to show contrast (similar results were obtained in the absence of dye).

Extremely low water contact angles are highly desirable for anti-fogging applications. Copolymer-fluorosurfactant complex dip coated glass slides using dimethylformamide solvent were found to retain their transparency (anti-fogging) during water vapour exposure, FIG. 4.

Figure 5:
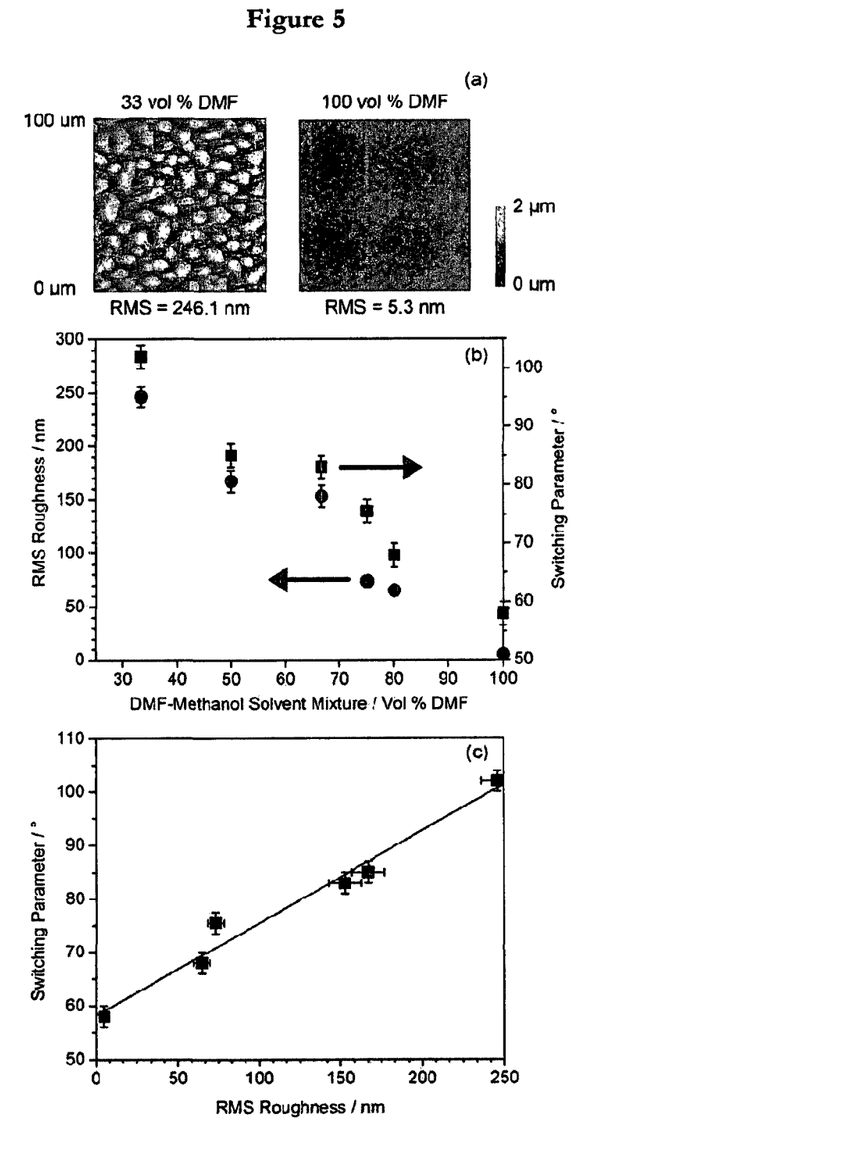
FIG. 5 illustrates a demonstration of self-cleaning: (a) uncoated glass slide and poly(ethylene-alt-maleic anhydride)-fluorosurfactant complex coating solvent cast from dimethylformamide fouled with hexadecane; and (b) after quick rinse with water.

Self-cleaning properties were demonstrated by rinsing off fouling oils with just water, FIG. 5. This is consistent with the high receding contact angle measured for hexadecane, Table 2.

Figure 6:
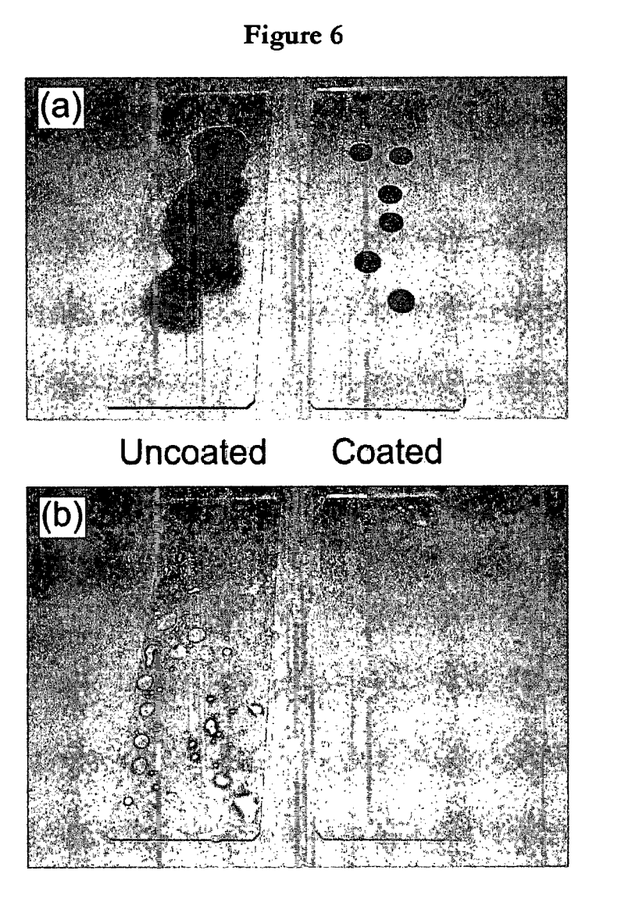
FIG. 6 illustrates (a) AFM height images and RMS roughness values for poly(styrene-co-maleic anhydride)-fluorosurfactant complex surfaces spin coated from different vol % dimethylformamide-methanol solutions; (b) AFM RMS roughness and hexadecane-water static contact angle switching parameter of poly(styrene-co-maleic anhydride)-fluorosurfactant complex surfaces as a function of dimethylformamide-methanol solvent mixture composition; and (c) correlation between hexadecane-water static contact angle switching parameter of poly(styrene-co-maleic anhydride)-fluorosurfactant complex surfaces and AFM RMS roughness.

Further enhancement of the oleophobic-hydrophilic surface switching behaviour was investigated for the poly(styrene-co-maleic anhydride)-fluorosurfactant system by varying the casting solvent mixture composition, FIG. 6. Diluting dimethylformamide with methanol gives rise to an increase in surface roughness, which is attributable to the poor solubility of the styrene block segments in methanol. This solvent-induced roughness lowers the static water contact angle (<10°) whilst concurrently raising the static hexadecane contact angle (>110°), to yield a hexadecane-water switching parameter exceeding 100°, FIG. 6. Control experiments showed a lack of surface roughness enhancement by varying the dimethylformamide-methanol solvent composition for poly(ethylene-alt-maleic anhydride)-fluorosurfactant and the poly(styrene-alt-maleic anhydride)-fluorosurfactant complex solutions, which is consistent with the absence of low methanol solubility styrene block segments being present in the alternating copolymer structures, Scheme 1.

Figure 7:
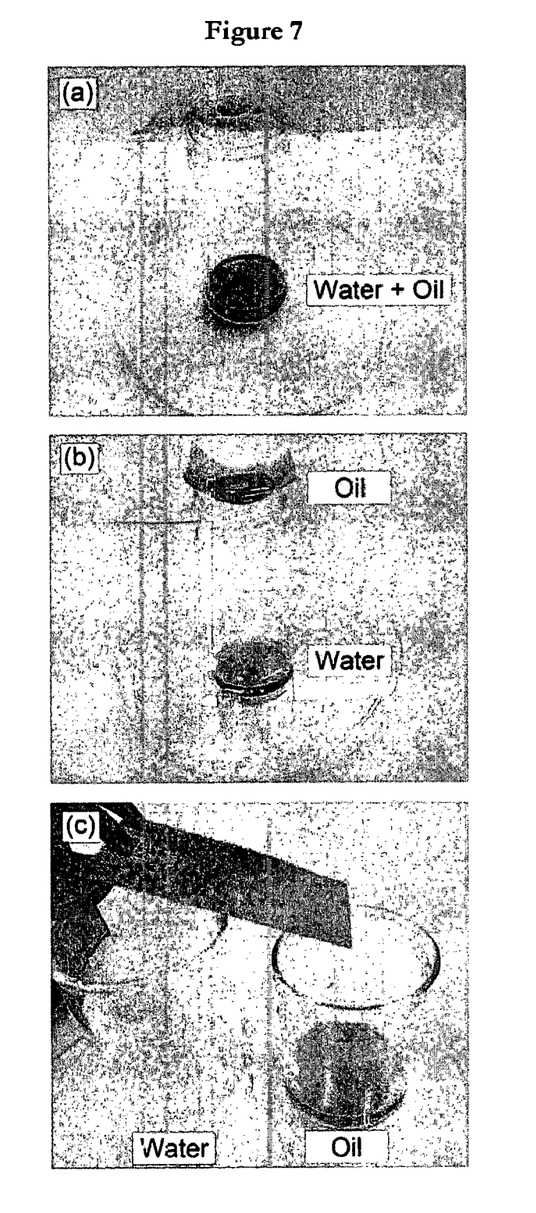
FIG. 7 illustrates a demonstration of oil-water separation: hexadecane-water mixture dispensed onto (a) uncoated stainless steel mesh; (b) stainless steel mesh dip coated with poly(styrene-co-maleic anhydride)-fluorosurfactant complex in 33 vol % dimethylformamide-66 vol % methanol solvent mixture; and (c) inclined coated stainless steel mesh dip coated with poly(styrene-co-maleic anhydride)-fluorosurfactant complex in 33 vol % dimethylformamide-66 vol % methanol solvent mixture acting as oil-water separator (oil and water are shown to be collected into separate beakers).

Oil-water separation efficacy was tested using copolymer-fluorosurfactant complex coatings dip coated onto stainless steel mesh. These were then suspended over a sample vial followed by dispensing an agitated oil-water mixture. The water component was observed to pass through the mesh whilst the oil (hexadecane) remained suspended on the mesh surface, FIG. 7. These meshes were then inclined at an angle, and pouring the oil-water mixture over them yielded separation efficiencies as high as 98% in the case of the poly(styrene-co-maleic anhydride)-fluorosurfactant complex surface (attributable to the dimethylformamide-methanol solvent mixture induced roughness enhancement of the oil-water switching parameter), FIG. 7 and Table 3. Similar behaviour was observed for octane- and motor oil-water mixtures. Hexadecane was dyed with Oil Red O (Sigma Aldrich Ltd.) to show contrast (similar results were obtained in the absence of dye). The absence of solvent induced roughness resulted in lower oil-water separation efficiencies for the two alternating copolymer-fluorosurfactant complex systems.

TABLE 3

Oil-water separation efficiencies for copolymer-fluorosurfactant complex dip coated stainless steel mesh from 33 vol % dimethylformamide-66 vol % methanol solvent mixtures.

| Switching Surface | AFM RMS Roughness/nm | Oil-Water Separation Efficiency[a]/% |
|---|---|---|
| Poly(ethylene-alt-maleic anhydride) + fluorosurfactant | 1.1 ± 0.3 | 0 |
| Poly(styrene-alt-maleic anhydride) + fluorosurfactant | 2.7 ± 0.3 | 48 ± 4 |
| Poly(styrene-co-maleic anhydride) + fluorosurfactant | 246 ± 3 | 98 ± 2 |

[a]100% efficiency corresponds to complete separation of water from hexadecane.

Previously reported polymer-fluoro surfactant complex surfaces which display oleophobic-hydrophilic switching behaviour rely on the inherent hydrophilicity of the base polymer. For instance, in the case of solvent cast ionic polymer-fluorosurfactant complex surfaces, the fluorinated surfactant tails segregate at the air-solid interface, thereby aligning the hydrolysed counterionic groups towards the near-surface region as a consequence of their strong electrostatic attraction towards the ionic surfactant head. This interfacial interaction leads to an enhanced concentration of hydrophilic groups in the near-surface region compared to the parent polymer. It has been proposed that such polymer-fluorosurfactant surfaces are able to exhibit oleophobic-hydrophilic switching behaviour due to the existence of defect sites or "holes" at the fluorinated surfactant tail air-solid interface through which water molecules can penetrate down towards the complexing counterion hydrophilic sub-surface. This description helps to explain why all three copolymer-fluorosurfactant complex systems in the present study display lower final static water contact angles compared to their parent base copolymers, FIG. 1 and Table 2.

Figure 8:
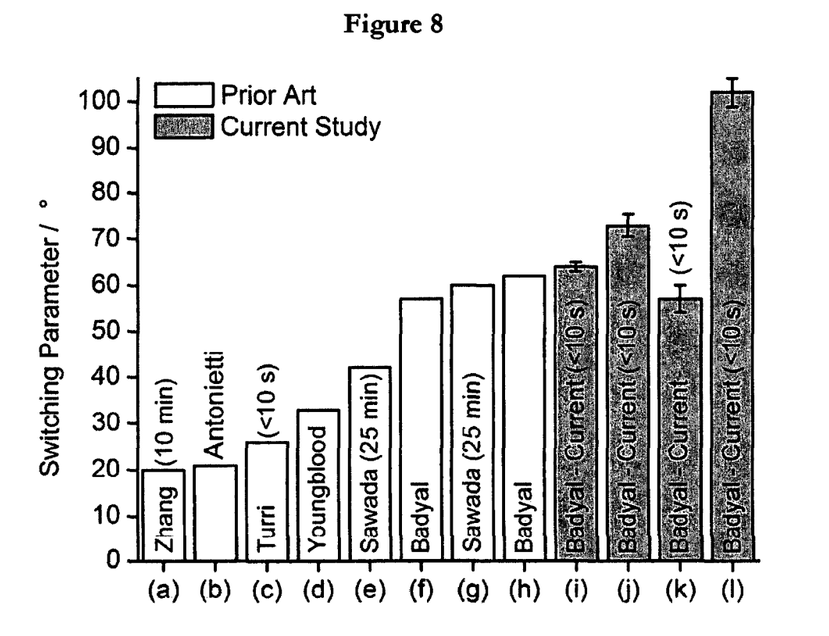
FIG. 8 illustrates oleophobic-hydrophilic switching parameters for nominally flat surfaces reported in the literature: (a) Zhang, (b) Antonietti, (c) Turri, (d) Youngblood, (e) Sawada, (f) Badyal, (g) Sawada, (h) Badyal, (i) poly(ethylene-alt-maleic anhydride)-fluorosurfactant (RMS=1.1±0.3 nm), (j) poly(styrene-alt-maleic anhydride)-fluorosurfactant (RMS=2.7±0.3 nm), (k) poly(styrene-co-maleic anhydride)-fluorosurfactant (smooth RMS=5.3±1 nm), and (l) poly(styrene-co-maleic anhydride)-fluorosurfactant (rough RMS=246±3 nm).

The oleophobic-hydrophilic behaviour of such polymer-fluorosurfactant complex surfaces can be quantified in terms of a switching parameter (for instance, the difference in measured static contact angle between hexadecane and water droplets), FIG. 8. Most previous studies have tended to quote water contact angles only after allowing the droplet to stabilise over several minutes on the surface because of the slow rate at which water molecules penetrate through towards the hydrophilic sub-surface to manifest surface switching (although the surface initially is hydrophobic). In the present invention, the time taken to reach a final static water contact angle is much shorter (<10 s) for all copolymer-fluorosurfactant systems. Furthermore, both styrene-containing copolymer-fluorosurfactant complex surfaces reach a final static water contact angle value much quicker than their ethylene-containing copolymer counterpart due to the bulky styrene side group providing a lower packing efficiency for the former, and thereby facilitating a faster penetration of water into the hydrophilic sub-surface, FIG. 1. This explanation is consistent with the styrene-based copolymer-fluoro surfactant complexes having lower glass transition temperatures, Table 1. In addition, for the case of the poly(styrene-alt-maleic anhydride) copolymer, the more disordered nature of the alternating styrene side groups provides a greater level of polymer chain mobility, which allows the fluorinated alkyl chains to reorient themselves more readily at the solid-air interface (culminating in instantaneous water wetting and high hexadecane contact angle values, FIG. 1 and Table 2).

Figure 3:
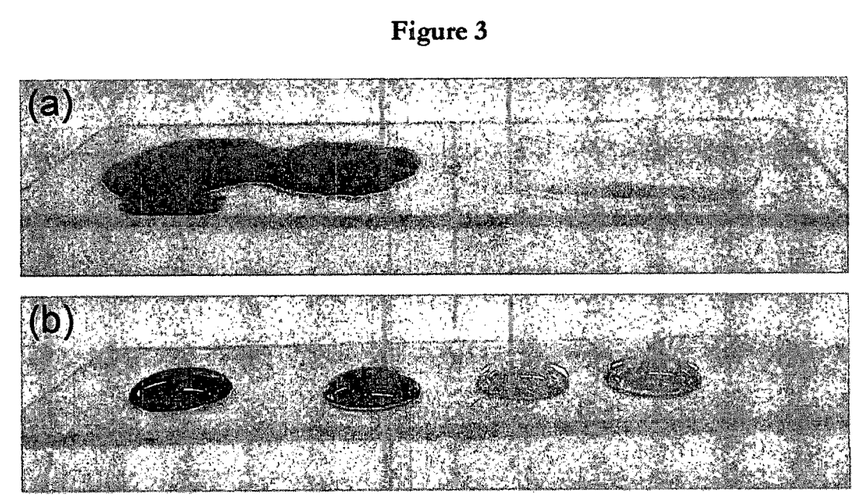
FIG. 3 illustrates hexadecane, octane, olive oil, and motor oil droplets (left to right) on: (a) uncoated glass slide; and (b) poly(ethylene-alt-maleic anhydride)-fluorosurfactant complex surface solvent cast from dimethylformamide.
Figure 4:
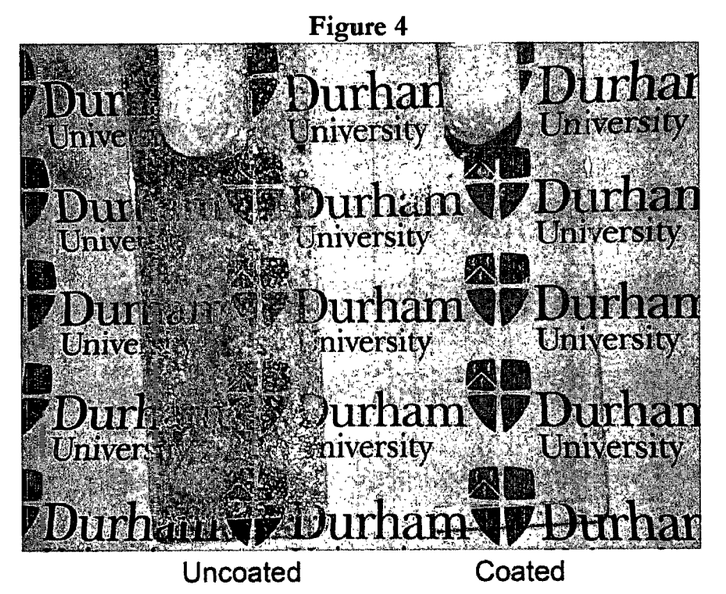
FIG. 4 illustrates a demonstration of anti-fogging following exposure to water vapour (fogging): on uncoated glass slide and poly(ethylene-alt-maleic anhydride)-fluorosurfactant complex solvent cast from dimethylformamide.

The high receding hexadecane contact angle and low surface roughness of copolymer-fluoro surfactant complex surfaces spin coated from dimethylformamide solvent make them ideal for self-cleaning and anti-fog applications, Table 2 and FIGS. 3-5. Such surfaces are easily cleaned by rinsing in water (which replaces the oil-solid interaction with a much more favourable water-solid interaction, i.e. switching).

Dissolving the poly(styrene-co-maleic anhydride)-fluorosurfactant complex in a dimethylformamide-methanol solvent mixture prior to film formation enhances surface roughness due to the poor solubility of the styrene block segments in methanol. This surface roughness is capable of improving hydrophilicity due to increased surface area (Wenzel wetting) and oleophobicity due to the ability to trap air (Cassie-Baxter wetting), Table 2. A key advantage of this approach is that it circumvents the need for introducing roughness as a separate step through the incorporation of additional materials or by mixing roughening particles into the copolymer-fluorosurfactant complex solution. It is envisaged that a range of different solvents or coating methods (e.g. spray coating) may be used to introduce surface roughness for the enhancement of the switching parameter for other types of polymer-surfactant complex systems.

Coating of steel mesh with such roughened poly(styrene-co-maleic anhydride)-fluorosurfactant complex surfaces (prepared from dimethylformamide-methanol solvent mixtures) provides two length scales of roughness (steel mesh pores plus solvent-induced film roughness) both of which help to lower oil contact angle hysteresis (improve oil repellency). When combined with the inherent high switching parameter, oil-water separation with >98% efficiency is attained, Table 3. This performance matches existing oleophobic-hydrophilic systems for oil-water separation (which however tend to be far more complex in nature and fabrication methods). Although there are more efficient separation processes (99.999% efficiency) based on membrane filtration where small pores allow the passage of water whilst blocking oils, such filters have low volume throughput and can be easily clogged with excess oil (requiring cleaning or replacement).

One embodiment of the current methodology would be to deploy it for pre-treatment filters installed upstream of conventional membrane filters, thereby ensuring removal of the majority of oil-based contaminants so as to minimise the amount of oil reaching the membrane filters (and therefore avoid blockage as well as maximise efficiency). Such oil-water separators could potentially help to tackle the environmental impact of the gas, oil, metal, textile, and food processing industries.

Solvent cast copolymer-fluorosurfactant complexes have been found to display large magnitude oleophobic-hydrophilic switching behaviour as well as rapid switching speeds. Further enhancement in switching performance is achieved by combining surface chemical functionality and roughness. These ultra-fast switching oleophobic-hydrophilic surfaces have been shown to display excellent anti-fog, self-cleaning, and oil-water separation properties.

Thus smooth copolymer-fluorosurfactant complex film surfaces are found to exhibit fast oleophobic-hydrophilic switching behaviour. Equilibration of high oil contact angle (hexadecane=80°) and low water contact angle (<10°) values occurs within 10 s of droplet impact. These optically transparent surfaces display excellent anti-fogging and self-cleaning properties. The magnitude of oleophobic-hydrophilic switching can be further enhanced by the incorporation of surface roughness to an extent that it reaches a sufficiently high level (water contact angle<10° and hexadecane contact angle>110°) which, when combined with the ultra-fast switching speed, yields oil-water mixture separation efficiencies exceeding 98%.

The invention claimed is:

1. A coating which is oleophobic and hydrophilic with a switching parameter magnitude of at least 60° and a switching speed of less than 10 seconds.

2. A coating according to claim 1 wherein the coating has a switching parameter magnitude of at least 90°.

3. A coating according to claim 1 wherein the coating has a switching speed of less than 1 second.

4. A coating according to claim 1 wherein the coating comprises a co-polymer-fluorosurfactant complex.

5. A coating according to claim 4 wherein the coating forms a fast switching oleophobic-hydrophile polyelectrolyte fluorosurfactant surface.

6. A coating according to claim 4 wherein the co-polymer-fluorosurfactant complex is dipped or spin coated.

7. A coating according to claim 6 wherein the co-polymer-fluorosurfactant complex is by dipped or spin coated from a dimethylformamide (DMF) solvent.

8. A coating according to claim 7 wherein the coating has a surface with an AFM RMS roughness in the range of 1-5 nm.

9. A coating according to claim 8 wherein the surface is prepared for use as a coating with at least one anti-fogging application and self-cleaning applications.

10. A coating according to claim 1 wherein the coating includes a mixed solvent which is used to create a roughened surface effect on the coating.

11. A coating according to claim 10 wherein the said co-polymer-fluorosurfactant complex is applied by spin coating a dimethylformamide methanol solvent mixture.

12. A coating according to claim 11 wherein the roughness of the surface of the coating is increased by allowing the evaporation of at least one components of a mixed solvent mixture that is used to form the coating, as the coating dries.

13. A coating according to claim 1, wherein the coating further comprises an article which acts as a base.

14. A coating according to claim 13 wherein the base is a mesh, the mesh is configured to treat a material including a first component and a second different component, and at least one component of the material remains on the coating surface to be subsequently removed therefrom and the second different component of the material passes over the coating and hence through the mesh.

15. A coating according to claim 14 further comprising another layer of material, wherein the material which passes through the mesh is collected as a fluid or absorbed into the another layer of material.

16. A coating according to claim 13, wherein the base is a filter further comprising the mesh being part of a filtration system.

17. A coating according to claim 16 wherein the filtration system has a number of filters, at least one of which includes a mesh to which the coating is applied.

18. A coating according to claim 5, wherein the oleophobic-hydrophilic polyelectrolyte-fluorosurfactant surfaces is created by utilising a maleic anhydride co-polymer.

19. A coating according to claim 1, wherein the coating is a polymer-surfactant complex.

* * * * *